United States Patent
Jeong

(10) Patent No.: US 6,316,857 B1
(45) Date of Patent: Nov. 13, 2001

(54) SPINDLE MOTOR

(75) Inventor: Dae Hyun Jeong, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/568,482

(22) Filed: May 9, 2000

(30) Foreign Application Priority Data

Mar. 17, 2000 (KR) .................................................. 00-13610

(51) Int. Cl.$^7$ ............................. H02K 5/16; H02K 21/22; F16C 35/10; F16C 32/06
(52) U.S. Cl. ......................... 310/90; 310/67 R; 384/107; 384/111; 384/123; 360/98.08; 360/99.04; 360/99.08
(58) Field of Search .................... 310/90, 67 R; 384/100, 107, 111, 112, 113, 114, 121–123, 126–125; 360/98.09, 99.08, 99.04

(56) References Cited

U.S. PATENT DOCUMENTS

| | | | |
|---|---|---|---|
| 5,357,162 | 10/1994 | Aiyoshizawa et al. | 310/90 |
| 5,358,339 | 10/1994 | Konno et al. | 384/107 |
| 5,688,053 | * 11/1997 | Itoh et al. | 384/100 |
| 5,914,832 | * 6/1999 | Teshima | 360/98.07 |
| 6,034,454 | * 3/2000 | Ichiyama | 310/90 |
| 6,176,618 | * 1/2001 | Kawawada et al. | 384/107 |

* cited by examiner

Primary Examiner—Tran Nguyen
(74) Attorney, Agent, or Firm—Darby & Darby

(57) ABSTRACT

A spindle motor is disclosed which allows more excellent abrasion resistance and productivity exhibited by making the thrust to be integrally formed at driving shaft and by making each of kinetic pressure-generating grooves that generate fluid kinetic pressure in axial direction to be formed at different formation position from each other that may be less influenced than ever by force of friction with fluid material. Whence the formation for it by the present invention is composed of a base plate 10, a sleeve 20, a stator assembly 30, a shaft 40 molded integrally with flange-shaped thrust 41 at bottom part, a rotor assembly 50, a set of kinetic pressure-generating grooves 70 that generate fluid kinetic pressure in radial direction of shaft, which grooves are formed on inner diameter surface of the above sleeve 20 opposing the outer cylindrical surface of the above shaft 40, and another set of kinetic pressure-generating grooves 80 that generate fluid kinetic pressure in axial direction, which grooves are formed on cover plate 60 top surface and stepwise-jawed inner cylindrical surface of the above sleeve 20 or thrust 41 top surface.

6 Claims, 4 Drawing Sheets

SPINDLE MOTOR

BACKGROUND OF THE INVENTION

1. Field of the Invention

The present invention relates to a spindle motor that allows more excellent abrasion resistance and productivity exhibited by making each of kinetic pressure-generating grooves that generate fluid kinetic pressure in axial direction to be formed at position that is less influenced than ever by fluid material as thrust is integrally formed at driving shaft.

2. Description of the Prior Art

Generally spindle motor used in hard disk driver requires very high-speed driving force so that the motor employs fluid kinetic pressure bearing which has low drive load than at usual driving.

FIG. 1 shows an example of spindle motor applying conventional fluid kinetic pressure bearing, where are in large classification the fixed members of base plate 1, sleeve 2 and stator core assembly 3 and the rotating members of shaft 4, hub 5 and magnet 6 for comprising means of motor.

Sleeve 2 center has been holed through vertically so as to form an inner diameter part whose inner diameter has been enlarged at bottom part, to which inner diameter part a shaft 4 has been inserted to be able to revolve, which shaft has been bound by an interference fit with disk-shaped thrust 7 so that both of these can revolve together (at the inner diameter part side shaft 4 bottom part where the inner diameter has come widened as above).

And the bottom part of inner diameter part thus penetrated downward is isolated from outside by being covered by cover plate 8; and a cap-shaped hub 5 that is open downward is integrally combined at top part of shaft 4 inserted in sleeve 2.

In structure described above, usually a fine gap G is formed between inner diameter surface of sleeve 2 and thrust 7 and shaft 4 (inserted in the inner diameter part of sleeve 2 so that oil may float in gap G.

And kinetic pressure-generating grooves 2a are formed in shape as in FIG. 2 on upper and lower parts of inner diameter surface of sleeve 2 facing the outer cylindrical surface of shaft 4 intercalating the gap G in between; and kinetic pressure-generating grooves 7a are also formed as in FIG. 3 on top surface and bottom surface of thrust 7 that is bound at lower end portion of shaft 4.

Therefore oil floats through gap G between opposing surfaces of sleeve 2 and shaft 4 if motor is driven to rotate shaft 4 under condition where oil is filled in gap G (between the opposing surfaces of sleeve 2 and shaft 4.

Oil that floats thus is concentrated at kinetic pressure-generating grooves 2a that are formed respectively on upper and lower parts of inner diameter surface of sleeve 2 so that kinetic pressure is developed in radial direction of shaft; by which kinetic pressure generated thus, gap G (between the opposing surfaces of sleeve 2 and shaft 4 is always maintained uniformly.

And as thrust 7 bound at shaft 4 is accommodated at widened inner diameter part of sleeve 2, a certain is gap is also formed between stepwise-jawed inner cylindrical surface of sleeve 2 opposing top surface and bottom surface of thrust 7 and cover plate 8 top surface, through which gap the oil floats when motor is operated, which floating oil is concentrated at kinetic pressure-generating grooves 7a formed on top surface and bottom surface of thrust 7 so that kinetic pressure is developed in axial direction; by which kinetic pressure generated thus, gap between thrust 7 and its opposing surface is always maintained uniformly.

But there are some problems in part that generates fluid kinetic pressure in such conventional spindle motor.

Firstly, intense precision is required in processing inner diameter of thrust 7 as thrust 7 is assembled to shaft 4 by hot rolling, while inner diameter rectangularity control is very difficult where thrust 7 must be perpendicular to shaft 4.

And as kinetic pressure-generating grooves 7a formed on both sides of thrust 7 should be sequentially machined because simultaneous machining of the grooves is practically impossible, there arises machining deviation in the kinetic pressure-generating grooves 7a formed by such machining process.

Thrust 7 requires very difficult workmanship not only in processing of itself as above but also in assembling with shaft 4 so that productivity decrease is induced.

Secondly, as kinetic pressure-generating grooves 7a are formed at thrust 7 rotating simultaneously with shaft 4, thrust 7 abrasion resistance is deteriorated by severe friction with oil during shaft 4 rotation.

Thirdly, degrees of processing of kinetic pressure-generating grooves 7a formed on both sides of thrust 7 are made in noncongruity with each other because these both sides of grooves cannot be simultaneously machined; and particularly, because conventional shaft 4 and thrust 7 are made of SUS series metal while sleeve 2 is made to be furnished with stuff of brass or bronze that has higher thermal expansion coefficient than the above metal, gap G between shaft 4 and sleeve 2 and thrust 7 may be excessively wide open at high temperature because of thermal expansion coefficient diferrence of the above two kinds of materials, or deviation in gap G may be severely wide open so that there arise problems that severe vibration and noise are generated during motor operation and wear is accelerated.

Such problems result in a deterioration of drive performance of motor and a use life reduction so as to be product reliability deterioration factor.

SUMMARY OF THE INVENTION

Main purpose of the present invention is to improve thrust abrasion resistance by way of making the kinetic pressure-generating grooves that generate kinetic pressure in axial direction to be formed at cover plate and sleeve that oppose top surface and bottom surface of thrust and by way of making the thrust by forming it integrally with shaft, and is, at the same time, to allow more facile manufacturability and productivity enhancement.

Other purpose of the present invention is to manufacture sleeve from material having lower thermal expansion coefficient than that of shaft and thrust so that thermal deformation at time of high speed driving be prevented and an always stable driving can be performed.

The most significant feature of this invention to achieve the above purposes is to make formation comprising a base plate; a sleeve that is joined with the above base plate while the sleeve is holed through vertically, the inner diameter part of which is enlarged at bottom part so that this inner diameter part is stepwise differenced; a stator assembly-that is joined to outer cylindrical surface of the above sleeve above the above base plate; a shaft that is inserted in inner diameter part of the above sleeve so that the shaft can revolve and is molded integrally with flange-shaped thrust at bottom part coinciding with inner diameter bottom part where the inner diameter of the above sleeve has been widened; a rotor assembly where hub center part is joined integrally to top part of the above shaft and a magnet is attached at inner cylindrical surface that is outer cylindrical surface edge part of the above hub extended downward, which magnet generates electromagnetic force by interaction with the above stator assembly; a set of kinetic pressure-generating grooves that generate kinetic pressure in radial direction of shaft, which grooves are respectively formed on upper and lower part of inner diameter surface of the above sleeve opposing the outer cylindrical surface of the above shaft; and another set of kinetic pressure-generating grooves that generate kinetic pressure in axial direction, which grooves are respectively formed on the top surface of cover plate that is furnished oppositely to bottom surface of the above thrust while covering the bottom part of inner diameter part of the above sleeve and the thrust top surface or its opposing stepwise differenced inner cylindrical surface of the above sleeve.

DESCRIPTION OF THE PREFERRED EMBODIMENTS

Figure 1:
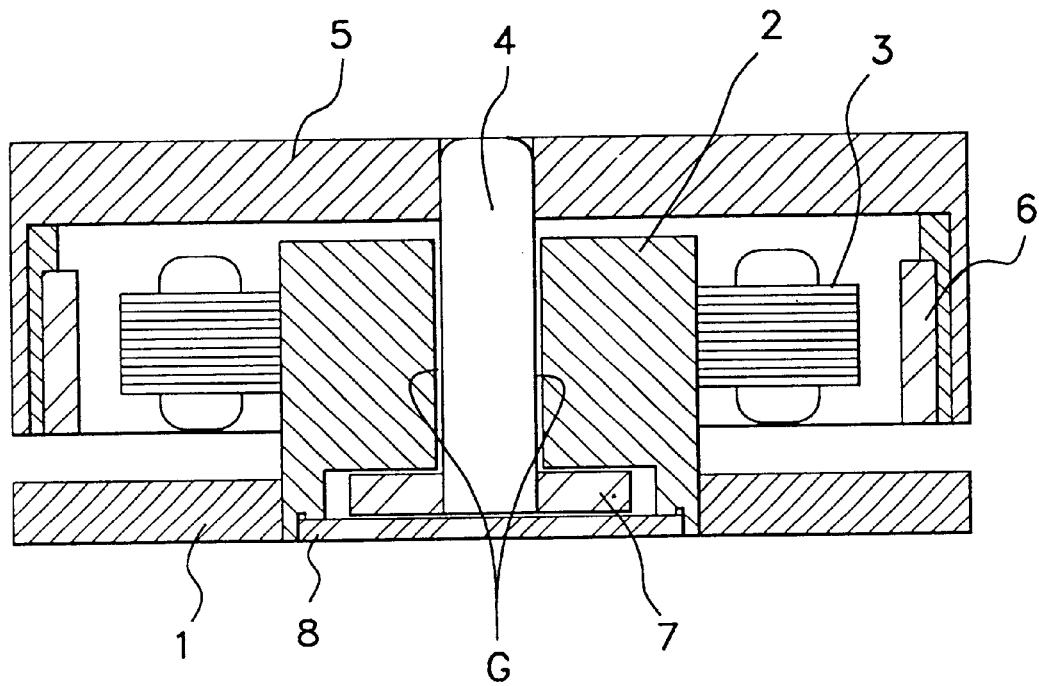
FIG. 1 is a lateral cross section view of conventional spindle motor.
Figure 2:
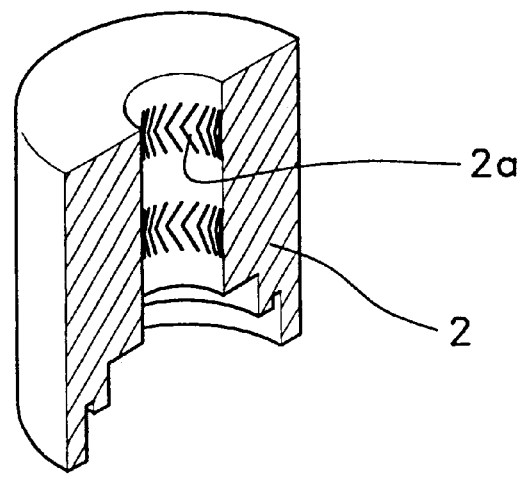
FIG. 2 is an oblique view of partial cross section of sleeve of conventional spindle motor.
Figure 3:
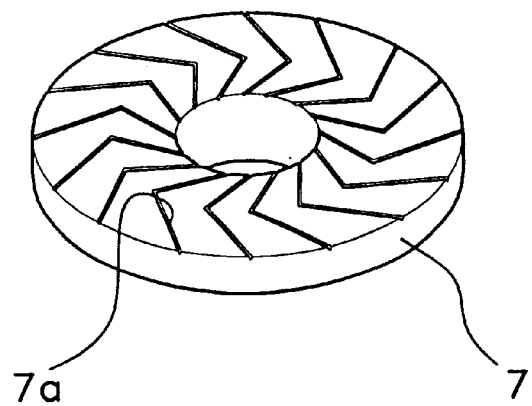
FIG. 3 is an oblique view of thrust of conventional spindle motor.
Figure 4:
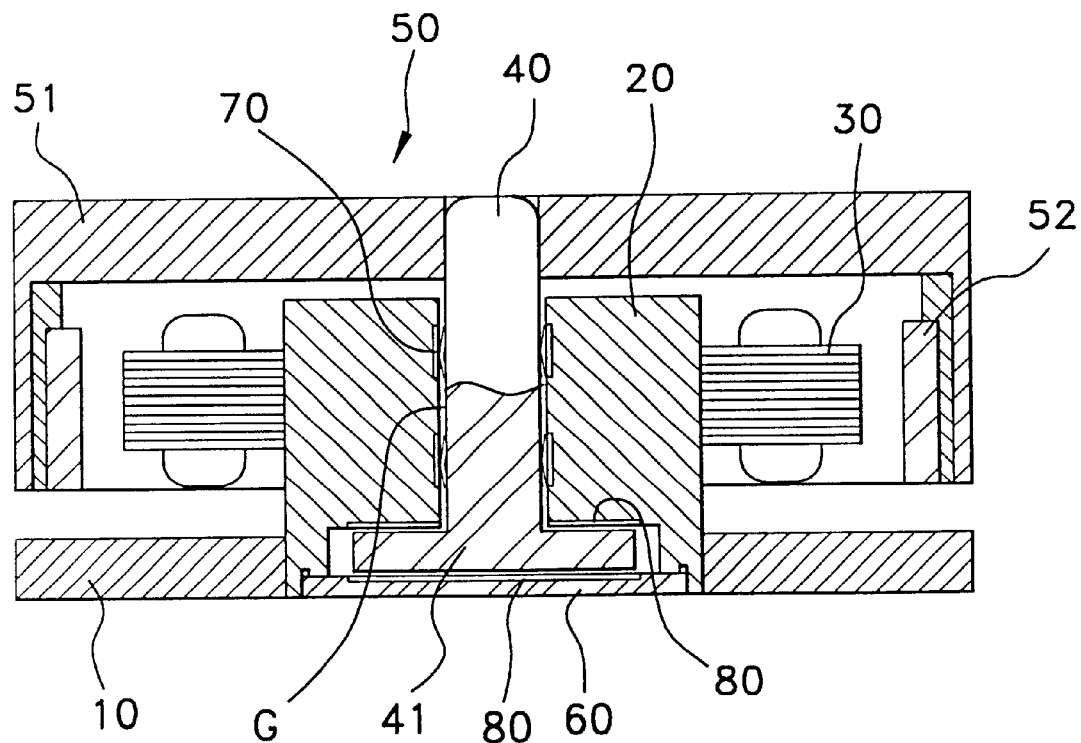
FIG. 4 is a lateral cross section view of spindle motor according to the present invention.

FIG. 4 is a lateral cross section view showing an example of spindle motor according to the present invention, whose composition is largely made of base plate 10, sleeve 20 and stator assembly 30 and shaft 40 and rotor assembly 50, which formation is same as conventional.

So base plate 10 is planar fixed member to which a pipe-shaped sleeve 20 is tightly fitted by interference fit or with adhesive, center of which sleeve has been holed through vertically.

Stator assembly 30 is jointed at outer cylindrical surface of sleeve 20 and shaft 40 is inserted at inner diameter part where sleeve 2 center has been holed through vertically for shaft 40 to be able to revolve.

And rotor assembly 50 shall be bound at shaft 40 which assembly 50 is composed of a cap-shaped hub 51 whose outside edge has been extended downward and a magnet 52 attached at inner cylindrical surface that is outer cylindrical surface edge part extended downward of the above hub 51; and cover plate 60 shall be attached by adhesive etc. at sleeve 20 bottom part which cover plate 60 makes the inner diameter part that is open downward to be closed up.

Spindle motor having formation as above operates by revolving rotor assembly 50 together with shaft 40 owing to electromotive force generated by interaction between stator assembly 30 core and rotor assembly 50 magnet 52 when electric power is supplied from outside to stator assembly 30.

By the way a fine gap G is formed between outside diameter surface of shaft 40 and inner diameter surface of sleeve 20 in order to prevent friction with sleeve 20 when shaft 50 revolves, in which gap G oil is filled.

Oil filled in gap G as above flows in shaft 40 revolution direction when shaft 40 revolves so that a certain oil pressure is developed, by which influence of the oil pressure the shaft 40 exhibits property to move in axial direction and radial direction of shaft.

So in previous practices, kinetic pressure-generating grooves 70 are built up on outside diameter surface of shaft 40 or its opposing inner diameter surface of sleeve 20 at least on one side surface of these two surfaces so that a strong fluid kinetic pressure may be developed in radial direction of shaft with gap G in between. Wherewith by this fluid kinetic pressure the gap G between sleeve 20 and shaft 40 is made to maintain uniformity.

For the most part in previous cases, kinetic pressure-generating grooves 70 built as a means to generate fluid kinetic pressure in radial direction of shaft as above was formed on outside cylindrical surface of shaft 40; but because there is problem that, if kinetic pressure-generating grooves are formed at shaft 40 that is a revolving member, friction with oil becomes serious which friction force acts as rotation load owing to which the abrasion resistance of shaft 40 deteriorates, nowadays general practice is to build the kinetic pressure-generating grooves 70 on inner diameter surface of sleeve 20 that is nondriving member, which grooves are to generate fluid kinetic pressure in radial direction of shaft as above.

On other hand, thrust 41 is furnished at shaft 40 bottom part as a means to generate fluid kinetic pressure in axial direction together with that in radial direction of shaft as above.

Generally thrust 41 is formed as a circular planar member having larger outer diameter than inner diameter of sleeve 20 in which shaft 40 is inserted and therefore inner diameter of sleeve 20 to which the thrust 41 is furnished shall be widened than outer diameter of thrust 41 so that eventually inner diameter part of sleeve 20 has step-differenced shape where inner diameter is larger at bottom part than at upper part.

The above thrust 41 prevents rising up when shaft 40 revolves and allows to support load in axial direction as fluid kinetic pressure is generated between top surface of cover plate 60 that closes up the bottom part of inner diameter part and thrust 41 bottom surface and between thrust 41 top surface and step-differenced inner cylindrical surface of sleeve 20.

Figure 5:
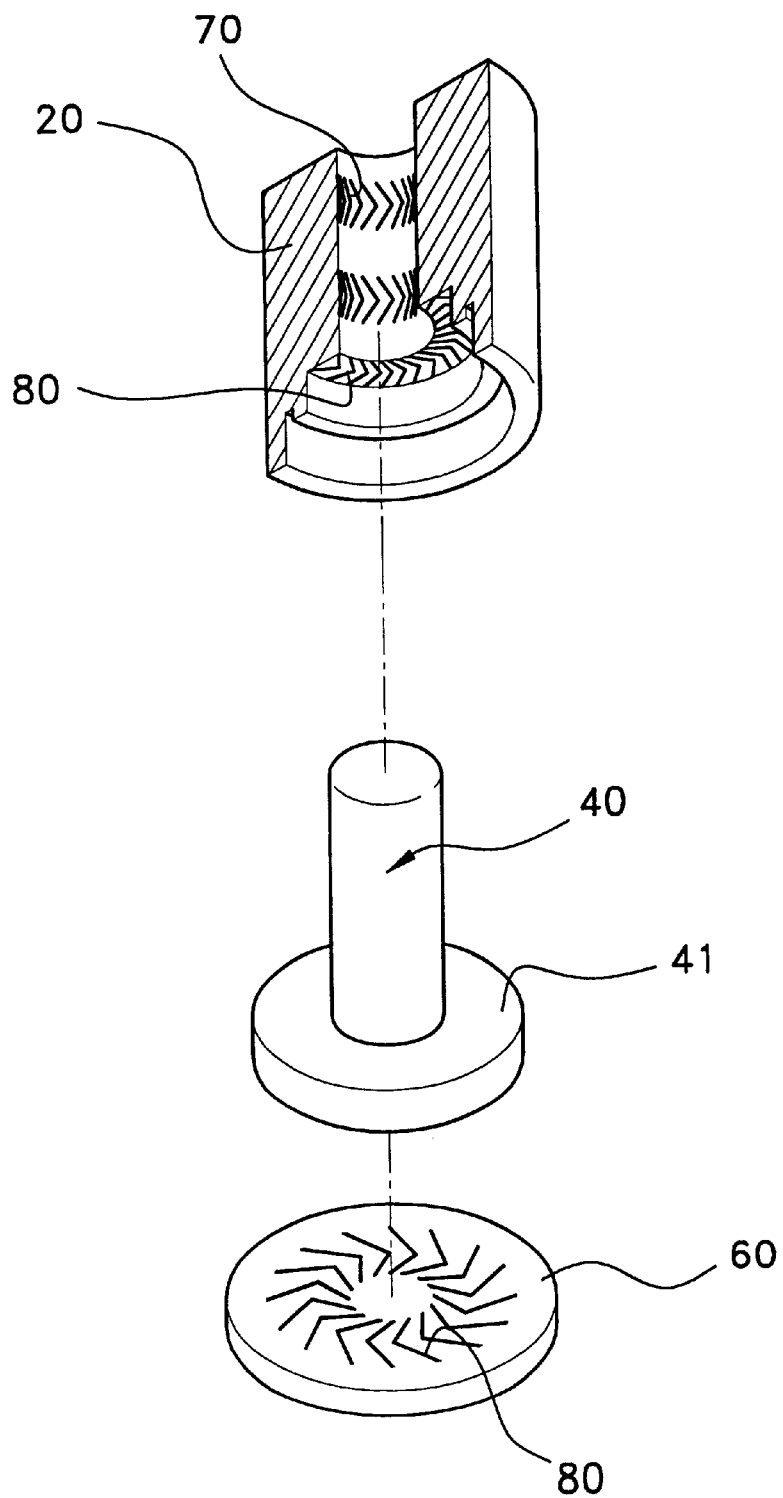
FIG. 5 is a disassembled oblique view showing an example of fluid kinetic pressure bearing in spindle motor according to the present invention.

An example of the present invention has structure where thrust 41 is manufactured by molding integrally with shaft 40 as in FIG. 5 so not as a separate part material as the example furnishes thrust 41 as a means to generate fluid kinetic pressure for support of load in axial direction as above and its most significant feature is that kinetic pressure-generating grooves 80 to generate fluid kinetic pressure in axial direction are respectively built on the upper surface of thrust, a step-difference inner diameter surface of sleeve 20 opposing the top surface of thrust 41, and the top surface of cover plate 60.

That is to manufacture thrust 41 integrally molding in a flange type to the lower end of shaft 40 and to build kinetic pressure-generating grooves 80 that will generate fluid kinetic pressure in axial direction simultaneously on step-difference inner cylindrical surface of sleeve 20 and cover plate 60 top surface that are opposing the top surface and the bottom surface of thrust 41 respectively.

This is to change position of formation of kinetic pressure-generating grooves 80 by forming them on cover plate 60 and sleeve 20 that are fixed members to support shaft against shaft in contrast to conventional practices that the kinetic pressure-generating grooves for axial direction were formed on thrust rotating with shaft.

Figure 6:
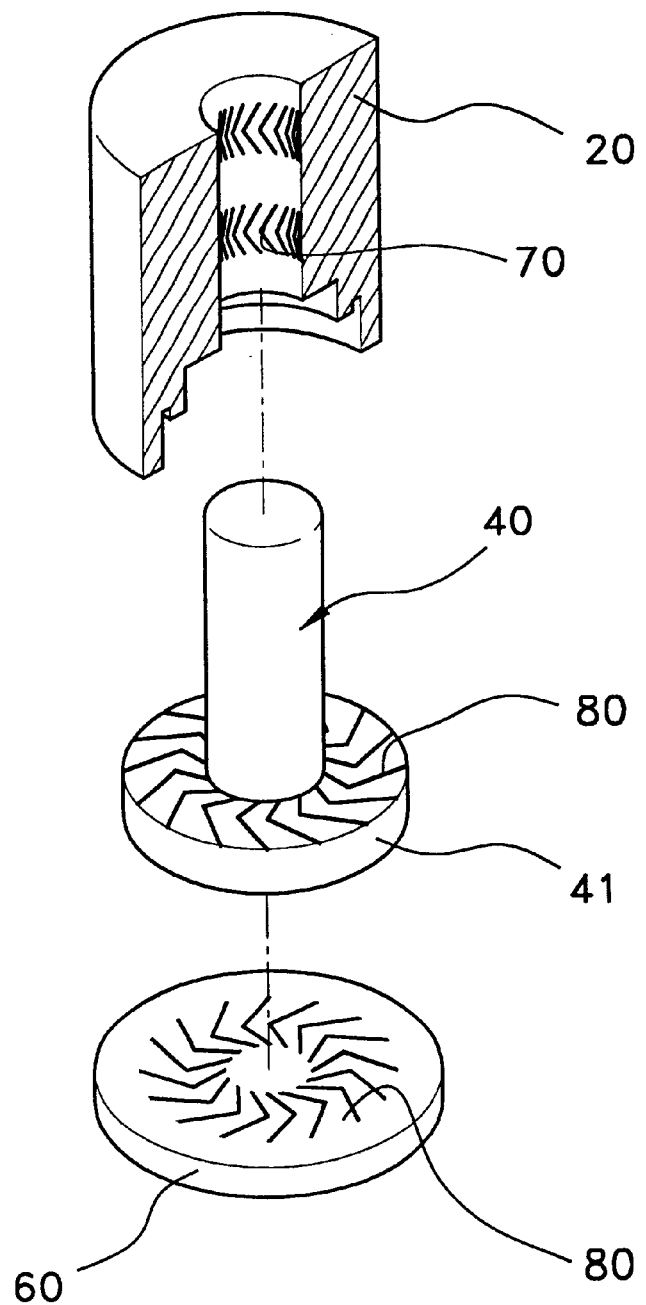
FIG. 6 is a disassembled oblique view showing another example of fluid kinetic pressure bearing in spindle motor according to the present invention.

But it can also be practiced that kinetic pressure-generating grooves 80 generating fluid kinetic pressure in axial direction be respectively built on thrust 41 top surface and cover plate 60 top surface as in FIG. 6 differently from the above formation.

Whence thrust 41 shall be furnished in formation by molding integrally with shaft 40 as in example described before.

In layout as above, it is preferable to make sleeve 20 from material having same or lower thermal expansion coefficient than that of shaft 40 or cover plate 60 though stainless metal may be used for shaft 40 and cover plate 60 as conventional.

First of all there comes merit that manufacturing becomes easier by integrally manufacturing the shaft 40 and the thrust 41 than manufacturing the shaft and the thrust in formation of individual constructions as conventional, if formation structure of thrust 41 and kinetic pressure-generating grooves 80 for axial direction is improved as above.

And because shaft 40 and thrust 41 must be made in formation of mutual perpendicularity, the control of machinability of inner diameter surface of thrust that is jointed with shaft, particularly the control of rectangularity has been very difficult when these two were individually manufactured as conventional, but rectangularity becomes easy between these two elements when they are integrally manufactured as in the present invention so that production speed may also become very fast.

Also more uniform machinability and facile workmanship can be provided in comparison to case of both surface machining on thrust as conventional if kinetic pressure-generating grooves 80 are built on cover plate 60 top surface and stepwise differenced inner cylindrical surface of sleeve 20 that is the driven body or on cover plate 60 top surface and thrust 41 top surface, which grooves 80 shall be built up to generate kinetic pressure in axial direction.

Namely, if kinetic pressure-generating grooves are to be built on both sides of thrust while simultaneous machining of both sides are infeasible, one side surface shall be machined first after which the other side surface shall be machined but there may be defect that eventually the both surface processibility cannot be achieved equally because one side that supports the thrust has been already processed in contrast to other side now being processed so that difference arises between these two sides while merit is brought out that an always uniform processibility can be maintained if the pair of kinetic pressure-generating grooves 80 are built at different conformation from each other as in the present invention.

Particularly motor abrasion resistance may be improved as force of friction with oil that floats by driving force of driving body will be substantially reduced if kinetic pressure-generating grooves 80 are built on cover plate 60 top surface and stepwise differenced inner cylindrical surface of sleeve 20 that is not a driving body but a driven body.

And if sleeve 20 is furnished with material having same or lower thermal expansion coefficient than that of shaft 40 or cover plate 60 as described before, oil gap G between sleeve 20 and shaft 40 can be made not to be further widened for at least initial period of operation owing to heat of high temperature occurring by high speed driving of motor, so that characteristics change rate at high temperature is reduced according to which the characteristics of NRRO (non-repeatable runout) and RRO (repeatable runout) at motor may be improved.

And it is most preferable to make shaft 40 from material having higher surface hardness than sleeve 20 so as to prevent lethal effect to the drive characteristics arising by deformation at time of operation because shaft 40 is a rotating member.

The greatest merit of the present invention as explained above is to allow abrasion resistance to be improved by minimizing the friction force between oil and kinetic pressure-generating grooves 80 at Lime of motor driving by forming the kinetic pressure-generating grooves 80 on cover plate 60 top surface and stepwise differenced inner cylindrical surface of sleeve 20 that is a fixed member or on cover plate 60 top surface and, instead of inner cylindrical surface of sleeve 20, on its opposing thrust 41 top surface respectively, which grooves 80 of the above are to generate kinetic pressure in axial direction, while thrust 41 shall be integrally molded with shaft 40, whence the merit at the same time is to allow a uniform and more facile processibility of kinetic pressure-generating grooves 80 to be provided.

And the present invention has merit of performance enhancement of improving the characteristics of NRRO and RRO which affect vibration and noise of motor, by reducing the high temperature characteristics variation rate according to high speed operation of motor, by way of molding the shaft 40 from material having higher surface hardness than sleeve 20 that is a fixed member while shaft 40 is a driving member, together with making the sleeve 20 so that this have lower or similar thermal expansion coefficient when compared with shaft 40.

According to conformation and action of the present invention as above, very useful effects may be provided to substantially increase motor usage life elongation and performance reliability by increasing kinetic pressure-generating grooves 80 processibility and productivity along with workmanship in process line manufacturing the motor and also by improving NRRO and RRO characteristics and abrasion resistance at driving time.

What is claimed is:

1. A spindle motor comprising:

a base plate;

a sleeve that is joined with said base plate, said sleeve is hollowed through vertically, the interior of the sleeve is widened at a bottom part so that said interior is stepwise difference;

a stator assembly is joined to an outer surface of said sleeve above said base plate;

a shaft inserted in said sleeve so that said shaft can revolve and is integral with a flange-shaped thrust at a bottom part coinciding with the interior where said sleeve interior has been widened;

a rotor assembly with a hub center part joined to a top part of said shaft and a magnet attached at an inner cylindrical surface that is an outer cylindrical edge of said hub extended downward, the magnet generates electromagnetic force by interaction with said stator assembly;

a set of pressure-generating grooves that generate fluid kinetic pressure in a radial direction of the shaft, the grooves are respectively formed at upper and lower parts of the interior of said sleeve opposing the outer surface of said shaft; and another set of pressure-generating grooves that generate fluid kinetic pressure in an axial direction, the grooves are respectively formed at a top surface of the base plate that is opposite a bottom surface of said thrust within said stepwise difference interior of said sleeve.

2. A spindle motor comprising:

a base plate;

a sleeve that is joined with said base plate, said sleeve is hollow through vertically, the interior of the sleeve is widened at a bottom part so that said interior is stepwise difference;

a stator assembly is joined to an outer surface of said sleeve above said base plate;

a shaft inserted in said sleeve so that said shaft can revolve and is integral with a flange-shaped thrust at a bottom part coinciding with the interior where said sleeve interior has been widened;

a rotor assembly with a hub center part joined to a top part of said shaft and a magnet attached at an inner cylindrical surface that is an outer cylindrical edge of said hub extended downward, the magnet generates electromagnetic force by interaction with said stator assembly;

a set of pressure-generating grooves that generate fluid kinetic pressure in a radial direction of the shaft, the grooves are respectively formed at upper and lower parts of the interior of said sleeve opposing the outer surface of said shaft; and another set of pressure-generating grooves that generate fluid kinetic pressure in an axial direction, the grooves are respectively formed at a top surface of the base plate that is opposite a bottom surface of said thrust within said stepwise difference interior of said sleeve;

wherein said sleeve is made of material having a lower or similar thermal expansion coefficient to that of said shaft.

3. A spindle motor comprising:

a base plate;

a sleeve that is joined with said base plate, said sleeve is hollow through vertically, the interior of the sleeve is widened at a bottom part so that said interior is stepwise difference;

a stator assembly is joined to an outer surface of said sleeve above said base plate;

a shaft inserted in said sleeve so that said shaft can revolve and is integral with a flange-shaped thrust at a bottom part coinciding with the interior where said sleeve interior has been widened;

a rotor assembly with a hub center part joined to a top part of said shaft and a magnet attached at an inner cylindrical surface that is an outer cylindrical edge of said hub extended downward, the magnet generates electromagnetic force by interaction with said stator assembly;

a set of pressure-generating grooves that generate fluid kinetic pressure in a radial direction of the shaft, the grooves are respectively formed at upper and lower parts of the interior of said sleeve opposing the outer surface of said shaft; and another set of pressure-generating grooves that generate fluid kinetic pressure in an axial direction, the grooves are respectively formed at a top surface of the base plate that is opposite a bottom surface of said thrust within said stepwise difference interior of said sleeve;

wherein said shaft is made of material having a higher surface hardness than said sleeve.

4. Spindle motor comprising:

a base plate;

a sleeve that is joined with said base plate, said sleeve is hollowed through vertically, the interior of the sleeve is widened at a bottom part so that this interior is stepwise difference;

a stator assembly joined to an outer surface of said sleeve above said base plate;

a shaft inserted in said sleeve so that said shaft can revolve and is integral with a flange-shaped thrust at a bottom part coinciding with bottom part where said sleeve interior has been widened;

a rotor assembly with a hub center part joined attached at an inner cylindrical surface that is an outer cylindrical edge of said hub extended downward, the magnet generates electromagnetic force by interaction with said stator assembly;

a set of kinetic pressure-generating grooves that generate fluid kinetic pressure in a radial direction of the shaft, the grooves are respectively formed at upper and lower parts of the interior of said sleeve opposing the outer surface of said shaft; and another set of kinetic pressure-generating grooves that generate fluid kinetic pressure in a axial direction, the grooves are respectively formed at a top surface of the base plate that is opposite a bottom surface of said thrust within the stepwise difference interior of said sleeve.

5. Spindle motor comprising:

a base plate;

a sleeve that is joined with said base plate, said sleeve is hollowed through vertically, the interior of the sleeve is widened at a bottom part so that this interior is stepwise difference;

a stator assembly joined to an outer surface of said sleeve above said base plate;

a shaft inserted in said sleeve so that said shaft can revolve and is integral with a flange-shaped thrust at a bottom part coinciding with bottom part where said sleeve interior has been widened;

a rotor assembly with a hub center part joined attached at an inner cylindrical surface that is an outer cylindrical edge of said hub extended downward, the magnet generates electromagnetic force by interaction with said stator assembly;

a set of kinetic pressure-generating grooves that generate fluid kinetic pressure in a radial direction of the shaft, the grooves are respectively formed at upper and lower parts of the interior of said sleeve opposing the outer surface of said shaft; and another set of kinetic pressure-generating grooves that generate fluid kinetic pressure in a axial direction, the grooves are respectively formed at a top surface of the base plate that is opposite a bottom surface of said thrust within the stepwise difference interior of said sleeve;

wherein said sleeve is made of a material having lower or similar thermal expansion coefficient to that of said shaft.

6. Spindle motor comprising:

a base plate;

a sleeve that is joined with said base plate, said sleeve is hollowed through vertically, the interior of the sleeve is widened at a bottom part so that this interior is stepwise difference;

a stator assembly joined to an outer surface of said sleeve above said base plate;

a shaft inserted in said sleeve so that said shaft can revolve and is integral with a flange-shaped thrust at a bottom part coinciding with bottom part where said sleeve interior has been widened;

a rotor assembly with a hub center part joined attached at an inner cylindrical surface that is an outer cylindrical edge of said hub extended downward, the magnet generates electromagnetic force by interaction with said stator assembly;

a set of kinetic pressure-generating grooves that generate fluid kinetic pressure in a radial direction of the shaft, the grooves are respectively formed at upper and lower parts of the interior of said sleeve opposing the outer surface of said shaft; and another set of kinetic pressure-generating grooves that generate fluid kinetic pressure in a axial direction, the grooves are respectively formed at a top surface of the base plate that is opposite a bottom surface of said thrust within the stepwise difference interior of said sleeve;

wherein said shaft is made of material having a higher surface hardness than said sleeve.

* * * * *